United States Patent
Goran, Jr.

[19]

[11] Patent Number: 5,813,790
[45] Date of Patent: Sep. 29, 1998

[54] ROPE FASTENER

[76] Inventor: Leo Goran, Jr., 2714 Deborah Dr., Punta Gorda, Fla. 33950

[21] Appl. No.: 715,584
[22] Filed: Sep. 19, 1996

Related U.S. Application Data

[60] Provisional application No. 60/004,615 Sep. 29, 1995.
[51] Int. Cl.$^6$ .......................................................... F16B 7/00
[52] U.S. Cl. ......................... 403/283; 24/115 R; 403/305; 403/378
[58] Field of Search ..................................... 403/283, 306, 403/305, 379, 378, 300, 376, 405.1, 294; 24/122.6, 115 N, 115 R, 136 R, 135 R, 136 L, 115 M

[56] References Cited

U.S. PATENT DOCUMENTS

| | | | |
|---|---|---|---|
| 1,050,116 | 1/1913 | Ewing | 403/306 X |
| 1,079,881 | 11/1913 | Reagles | 403/283 X |
| 1,662,610 | 3/1928 | Hokanson | 403/379 X |
| 1,983,282 | 12/1934 | Fuchs et al. | 403/305 |
| 2,071,270 | 2/1937 | Dellinger | 403/305 X |
| 2,339,671 | 1/1944 | Bergman | 24/115 R |
| 3,097,474 | 7/1963 | Rohdenburg | 403/379 X |
| 3,466,752 | 9/1969 | Behney | 24/115 R |
| 4,299,511 | 11/1981 | Demers | 403/283 X |
| 4,534,097 | 8/1985 | Mason | 403/283 X |
| 4,955,750 | 9/1990 | Goran | 403/306 |

*Primary Examiner*—Harry C. Kim
*Attorney, Agent, or Firm*—Harness, Dickey & Pierce, P.L.C.

[57] ABSTRACT

An improved rope fastener is disclosed having a resilient thermoplastic body with at least one longitudinal passage for receiving a rope therein. The fastener includes one or more nail receiving bores transverse to the rope passage and extending across the rope passage to enable a nail to be driven through the fastener and a rope to retain the rope in the fastener body. To prevent pushing of rope fibers into the nail bore as the nail is being driven through the rope, a closure is provided in the nail bores to prevent rope fibers from entering into the nail bore. The nails pierce through the closure as they enter the opposite side of the fastener body.

4 Claims, 2 Drawing Sheets

५,८१३,७९०

ROPE FASTENER

CROSS REFERENCE TO RELATED APPLICATION

This application claims the benefit of Provisional Application Ser. No. 60/004,615, filed Sep. 29, 1995.

BACKGROUND AND SUMMARY OF THE INVENTION

The present invention relates to a rope fastener having a plastic body with a passage therethrough receiving a rope with nails inserted transversely through the body and the rope to hold the rope within the body, and in particular, to an improved fastener having a stripper to prevent the rope fiber from being pushed into the nail hole ahead of the nail point.

The rope fastener of the present invention is preferably made of an extruded or molded thermoplastic material having a body with at least one longitudinal passage extending therethrough. One or more nail receiving holes extend through the body and diametrically across the longitudinal passage. A rope is inserted into the longitudinal passage and nails are driven through the body to hold the rope in the fastener body. The nails extend through the body on opposite sides of the longitudinal rope passage so as to be firmly anchored into the fastener body.

The fastener can include a single longitudinal rope passage for reception of two rope ends into the passage in an abutting relationship. Each rope end is secured to the fastener by one or more nails. In another embodiment, the fastener includes two parallel longitudinal rope passages which can be used to form a fixed loop at the end of the rope. In yet another embodiment, a hook or other device can be attached to the end of the rope with a fastener having a bore extending into the body for receiving a rope end. A variety of other fastener body shapes can be utilized with the present invention.

The basic concept of the rope fastener of this type is shown in greater detail in U.S. Pat. No. 4,955,750, which is hereby incorporated by reference.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
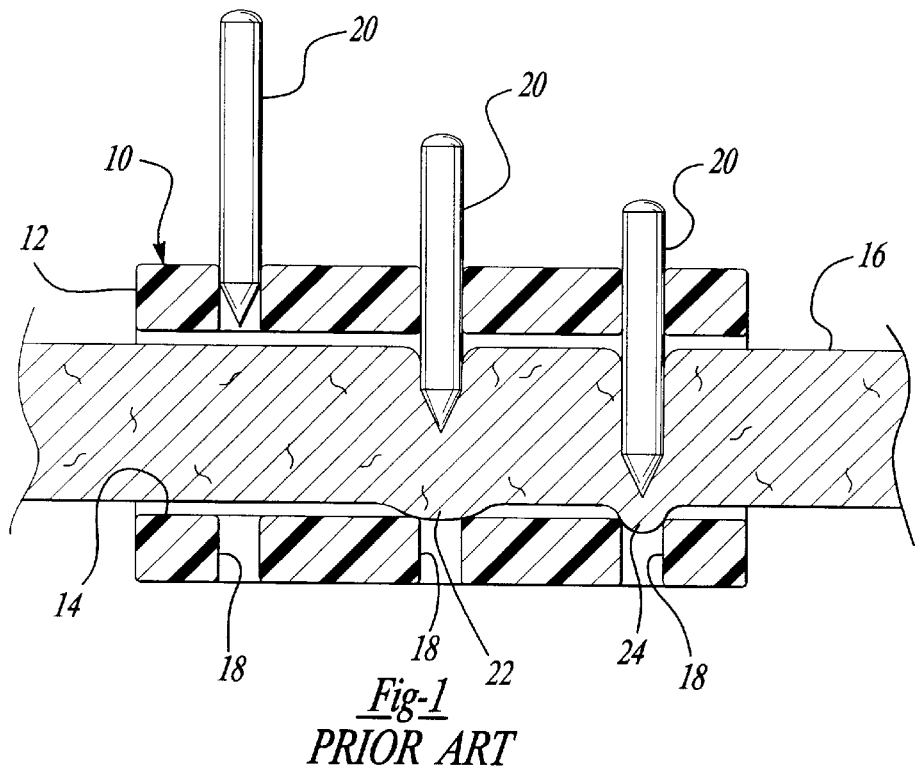
FIG. 1 is a sectional view of a prior art rope fastener illustrating the need for the improvement provided by the present invention.

With reference to FIG. 1, a prior art rope fastener 10 according to the above mentioned patent is shown in section. The fastener 10 has a body 12 with a longitudinal bore 14 extending therethrough forming a rope passage. A rope 16 is shown extending through the bore 14. The fastener body 12 is formed with one or more nail bores 18 extending transversely through the body and diametrically across the rope passage 14. The bores 18 are sized to receive nails 20. The nails are tightly fitted within the nail bores 18 and extend through the rope 16 to hold the rope firmly in place within the fastener body 12. The nail bores 18 extend completely through the body 12 and are open on opposite sides of the body. The nails 20 are shown in various stages of insertion. The lefthand nail 20 has just been inserted into the bore 18. The nail point has yet to reach the rope 16. A center nail 20 is inserted approximately half-way through the rope 16 and it can be seen that a lower portion 22 of the rope is being pushed by the nail against the surface of the bore covering the nail bore 18 The right-hand nail 20 has been inserted nearly through the rope 16 and is about to enter the nail bore 18 on the opposite side. It can be seen that a portion 24 of the rope fibers has been pushed into the nail bore 18 ahead of the nail point. With certain rope materials such as nylon, the pushing of the rope fiber into the nail bore will unduly restrict the nail. As the nail is driven into the nail bore, the fibers can cause cracking of the plastic body.

It is an object of the present invention to provide an improved rope fastener which is not subject to cracking caused by insertion of the rope fibers into the nail bore.

The present invention overcomes the problem of cracking as described above by closing the nail bore 18 along the rope passage 14. This prevents the insertion of the rope fibers into the nail bore. By closing the nail bore, the nail must now pierce through the closure before entering into the bore 18 on the opposite side of the fastener body.

Figure 2:
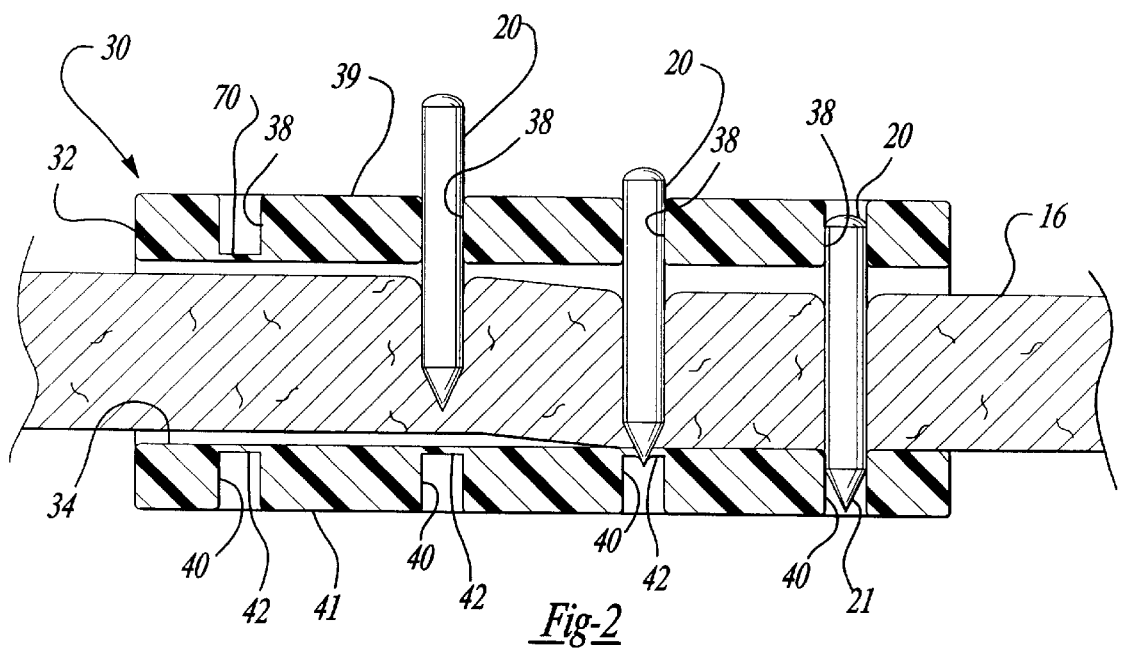
FIG. 2 is a sectional view of one embodiment of an improved rope fastener according to the present invention.

An improved rope fastener according to the present invention is shown in FIG. 2 and designated generally at 30. The fastener 30 includes a body 32 with a bore 34 forming a longitudinal rope passage. Nail bores 38 extend into the body 32 from the surface 39 on one side of the body. Nail bores 40 extend into the body from the surface 41 on the opposite side of the body. Each bore 38 is aligned with a bore 40. The nails are inserted first into bore 38, then cross the rope passage 34 and are then inserted into bore 40. Thus, the bore 40 is the initial nail receiving bore and the bore 40 is the secondary nail receiving bore. A thin breakthrough wall 42 is left between each secondary nail receiving bore 40 and the longitudinal passage 34. When the nails 20 are inserted through the bores 38 and into the rope passage 34, the breakthrough walls 42 will prevent rope fibers from being pushed by the nails into the nail bores 40. The breakthrough walls 42 will be pierced by the nails, allowing the nails to continue on into the nail bores 40. For ease in molding the body 32, a thin break through wall 70 is provided at the end of nail bores 38 closing the ends of the nail bores at the rope passage. This wall 70 is optional and does not affect the function of the fastener.

While this embodiment meets the desired objective of preventing cracking caused by insertion of the rope fibers into the nail bore, the nail bores 40 are open on the exterior of the rope fastener, leaving the nail points 21 exposed. This is not aesthetically pleasing and can discourage use of the rope fastener where it is thought that the nail points may scratch other objects with which the fastener may come into contact.

Figure 3:
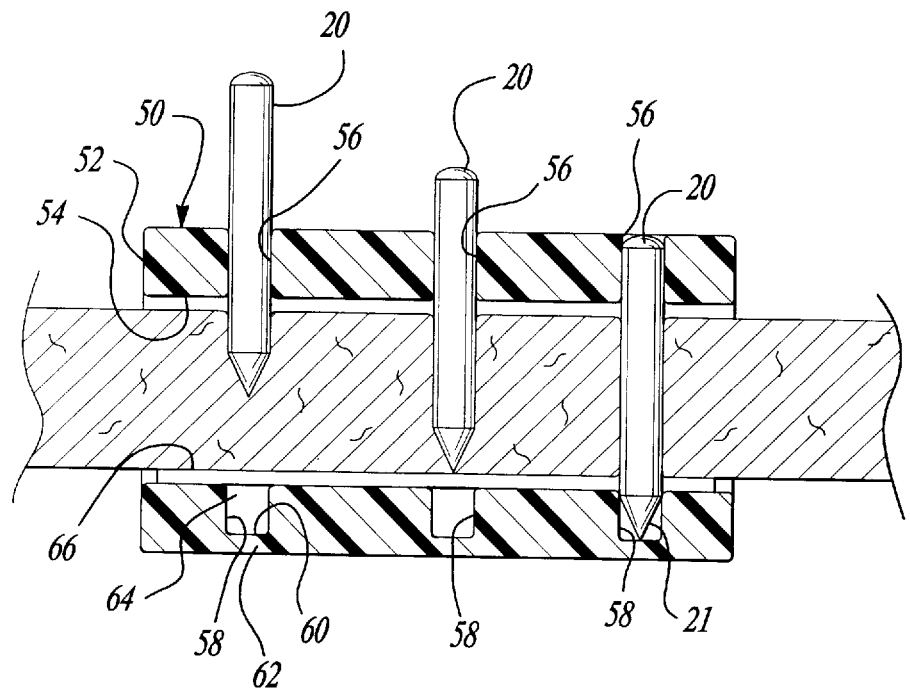
FIG. 3 is a sectional view of another embodiment of the improved rope fastener according to the present invention.
Figure 4:
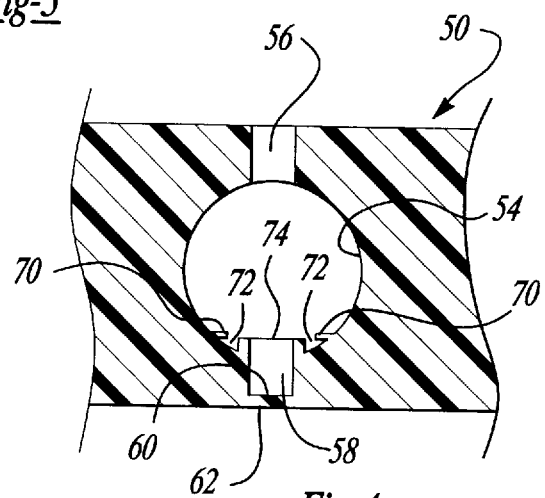
FIG. 4 is a sectional view of the rope fastener as seen from the line 4—4 in FIG. 3.

Another embodiment of the improved rope fastener is shown in FIG. 3 which overcomes the above disadvantage of the exposed nail point. The fastener 50 includes a body 52 having a longitudinal rope passage or bore 54 extending therethrough. In this embodiment, the body is formed with transverse initial nail receiving bores 56 on one side of the body which are open on the body exterior and which are open to the longitudinal passage 54.

Opposite the nail bores 56 are secondary nail receiving bores 58. Each bore 58 is molded with an end 64 that is open to the longitudinal rope passage 54 and a closed end 60 which is closed by a wall 62 at the exterior surface of the fastener body 52. The nail bores 56, 58 are formed by inserting slides into a plastic mold from one direction. After molding the body 52, the open ends 64 of the secondary nail receiving bores 58 that are open to the rope passage 54 are covered by a stripper plate 66. The stripper plate 66 is inserted into the longitudinal passage 54. A single stripper plate 66 covers all of the secondary nail receiving bores 58 which are open into the longitudinal passage 54. The stripper plate, like the breakthrough walls 42 shown in FIG. 2, prevents entry of the rope fibers into the secondary nail receiving bores 58 and thereby prevents cracking of the fastener body 52. The stripper plate can be made of a variety of materials such as metal, stainless steel, plastic, cardboard, wood, etc. The stripper plate is pierced by the nail points 21. For a half inch diameter rope fastener, the thickness for a stainless steel stripper plate is 0.005 inches. The stripper plate should be of a small size and should not interfere with the rope being pulled through the rope passage 54.

Figure 5:
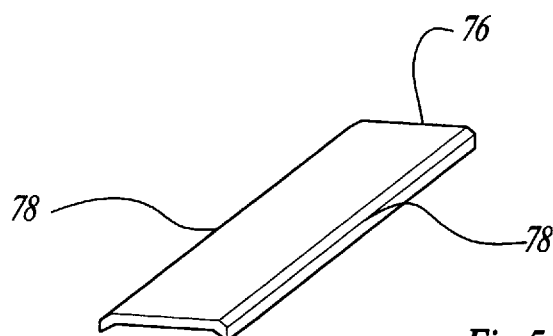
FIG. 5 is a perspective view of a stripper plate.

The stripper should be affixed within the fastener body to retain it in place so it is not pulled loose by the rope being dragged through the fastener. The stripper can be glued or heat staked in place or secured by a variety of mechanical means. One mechanical means to secure the stripper plate is to form the longitudinal passage 54 with a pair of inward extending flanges 70 which extend longitudinally through the rope passage 54 forming a pair of longitudinal grooves 72 there beneath, one on each side of the secondary nail receiving bores 58. The grooves receive the longitudinal edges of the stripper plate 66 to retain the stripper plate in place. Additionally, the area of the longitudinal rope passage immediately surrounding the secondary nail receiving bores 58 can be provided with a flat surface 74 to engage the underside of the stripper plate immediately around the secondary nail receiving bores 58. A stainless steel stripper plate 76 is shown in FIG. 5. The longitudinal edges of the plate 76 are bent downwardly to fit under the flanges 70 and into the grooves 72.

The principal advantage of the fastener 50 over the fastener 30 is that the secondary nail receiving bores 58 are closed on the exterior surface of the fastener by the wall 62, thus concealing the nail points and providing a more aesthetically pleasing appearance to the completed fastener. The fastener 50 can be used without the stripper plates provided the type of rope being used with the fastener is one that is not prone to being pushed into the nail bores.

It is to be understood that the invention is not limited to the exact construction illustrated and described above, but that various changes and modifications may be made without departing from the spirit and scope of the invention as defined in the following claims.

I claim:

1. A rope fastener comprising:

a body of a resilient material having a longitudinal rope passage extending therein having at least one open end and being of a size to receive a rope therein;

at least one nail bore extending through said body in a direction transverse to said rope passage and aligned to cross said rope passage, said nail bore having an initial nail receiving portion on one side of said rope passage and secondary nail receiving portion on the opposite side of the rope passage, said initial nail receiving portion having an open end on the exterior surface of said body for reception of a nail;

means retained by said body adjacent said rope passage for closing said secondary nail receiving portion adjacent said rope passage, said means for closing being penetrable by nails inserted into said initial nail receiving portion of said nail bore and across said rope passage to secure the rope within said rope passage to said body; and said nail for insertion into said at least one nail bore through said initial nail receiving portion and the rope and into said secondary nail receiving portion to retain the rope in said rope passage, said nail being tightly fitting in said nail bore whereby said nail is retained in said body.

2. The rope fastener of claim 1 wherein said means for closing said secondary nail receiving portion adjacent said rope passage comprises a longitudinally extending stripper plate mounted within said rope passage overlaying said secondary nail receiving portion of said nail bore within said rope passage.

3. The rope fastener of claim 2 further comprising a pair of longitudinally extending grooves in said rope passage for receiving longitudinally extending edges of said stripper plate to retain said stripper plate in said rope passage.

4. The rope fastener of claim 1 wherein said means for closing said secondary nail receiving portion adjacent said rope passage comprises a breakthrough wall formed by said body in said secondary nail receiving portion of said nail bore adjacent said rope passage whereby said secondary nail receiving portion is closed from said rope passage.

\* \* \* \* \*